United States Patent [19]

Smith

[11] Patent Number: 5,059,634
[45] Date of Patent: Oct. 22, 1991

[54] HIGH FLEXUAL MODULUS POLYURETHANE POLYMERS AND RIM PROCESSES EMPLOYING SAID POLYMERS

[75] Inventor: Stuart B. Smith, Conyers, Ga.

[73] Assignee: Resin Design International Corp., Norcross, Ga.

[21] Appl. No.: 477,749

[22] Filed: Feb. 9, 1990

[51] Int. Cl.$^5$ .............................................. C08K 7/00
[52] U.S. Cl. .................................. 521/167; 521/176; 528/77; 523/220; 524/456
[58] Field of Search ................ 521/167, 176; 528/77; 523/220; 524/456

[56] References Cited

U.S. PATENT DOCUMENTS

| | | | |
|---|---|---|---|
| 4,218,543 | 8/1980 | Weber et al. | 521/51 |
| 4,530,941 | 7/1985 | Turner et al. | 521/176 |
| 4,595,742 | 6/1986 | Nalepa et al. | 128/64 |
| 4,631,298 | 12/1986 | Presswood | 521/167 |
| 4,738,989 | 4/1988 | Smith | 528/55 |
| 4,748,192 | 5/1988 | Smith | 521/167 |
| 4,748,201 | 5/1988 | Smith | 528/51 |
| 4,786,656 | 11/1988 | Presswood et al. | 521/159 |
| 4,871,789 | 10/1989 | Martinez | 523/220 |

*Primary Examiner*—John Kight, III
*Assistant Examiner*—Duc Troung
*Attorney, Agent, or Firm*—Richard P. Crowley

[57] ABSTRACT

A polyurethane composition for use in RIM processes which composition comprises an MDI-polyol prepolymer, an aromatic diamine chain extender and a "cold break"-reducing additive to prevent "cold break" and to increase the flexual modulus of the polymer, which additive comprises triethanol amine or a triethanol amine-ethylene oxide end cap reaction product.

26 Claims, No Drawings

HIGH FLEXUAL MODULUS POLYURETHANE POLYMERS AND RIM PROCESSES EMPLOYING SAID POLYMERS

BACKGROUND OF THE INVENTION

Polyurethane polymers, that is, polymers prepared from compounds with an active hydrogen-containing functionality, such as for example, an amine or a polyol, with a isocyanate, either a polyisocyanate or a prepolymer, are widely employed in a number of processes. In particular, polyurethanes are employed in cast-type molding processes and more particularly in RIM processes. Thermosetting urethane polymer compositions particularly useful in the RIM processes typically comprise isocyanates, such as an isocyanate (MDI-polyol) prepolymer with excess isocyanate and an aromatic diamine as a chain extender, and more particularly an alkyl aromatic diamine for reaction with the isocyanate to form a polyurea-type urethane polymer. Optionally, the polymer composition may also contain additional reactive amounts of a polyol to form a hybrid urea urethane polymer, and optionally such compositions may include a catalytic amount of a catalyst, such as an organo-metallic catalyst and an amine or a combination.

Polyurethane compositions are widely used in the preparation of molded articles, particularly by the RIM process and wherein polyurethanes are employed with a chain extender mixture as a curing agent for forming molded articles having a high flexual modulus.

One widely used chain extender are di-alkyl aromatic diamines, and more particularly, di-ethyl toluene diamine and similar aromatic diamines for use with isocyanate prepolymers alone or with a polyol to form a hybrid polyurea polyurethane molding RIM composition. The chain extender known as DETDA is commercially used and comprises a mixture of isomers having about 76% of 1 methyl 3,5 di-ethyl 2,4 diamino benzene and about 24% of 1 methyl 3,5 di-ethyl 2,6 diamino benzene, that is, a ratio of about 80:20. DETDA is used as a chain extender with polyisocyanates and provides molded articles of the desired physical properties employed in the molding of automotive type articles, but its use is not restricted to such articles. The employment of di-alkyl aromatic diamine as chain extenders is set forth in U.S. Pat. No. 4,218,543, issued Aug. 19, 1980, hereby incorporated by reference. One problem associated with the use of DETDA compositions in RIM processes is that the gel time is quite short, for example, typically less than two seconds when employed with isocyanate prepolymers, such as MDI prepolymers. The molded article typically does not have a flexual modulus above about 80,000 psi at 75° F. without exhibiting an undesirable property known as "cold break" after demolding.

Other polyurethane chain extenders have been developed, such as for example, the di-alkyl thiodiamine chain extenders, and more typically, a mixture of the 2,4 and 2,6 isomers of the dimethyl thiotoluene diamine as described in U.S. Pat. No. 4,595,742, issued June 17, 1986, and sold commercially as ETHACURE-300 (a trademark of the Ethyl Corporation). The thiodiamine chain extenders do not have the rapid gel times of the DETDA compositions in RIM compositions, but rather extended gel times usually over 15 seconds. In addition, due to the thio linkage, the thio chain extenders are often undesirable and may create a sulfur or thio smell in the molded article. The thio chain extenders, like the DETDA, also do not provide for molded RIM articles in a RIM process with a flexual modulus above 80,000–90,000 psi without "cold break" in the molded article.

In an attempt to modify and control the difference in the gel times in the chain extenders, the chain extenders have been mixed to form a mixture of a di-alkyl toluene diamine and di-alkyl thiotoluene diamine, such as for example, as described in the U.S. Pat. No. 4,631,298, issued Dec. 23, 1986, hereby incorporated by reference. Further, polyhydroxy alkyl aromatic diamine compounds have been developed as chain extenders particularly for use in a RIM process with MDI prepolymers and wherein the chain extender composition comprises a blend of a polyol, like 1,4 butane diol and the di-alkyl thiotoluene diamine, which is described in U.S. Pat. No. 4,786,656, issued Nov. 22, 1988, hereby incorporated by reference.

It is desirable to provide for new and improved polyurethane compositions, particularly suitable for use in a RIM process, and more particularly, polyurea or hybrid polyurea polyurethane molding compositions to provide for an article having high, flexual strength and a practical, workable gel time and yet without exhibiting "cold break" properties on demolding.

SUMMARY OF THE INVENTION

The invention relates to thermosetting polyurethane polymer compositions and the method of using such compositions. In particular, the invention concerns polyurea and hybrid polyurea polyurethane polymer compositions and RIM method for producing molded articles employing such compositions.

A new and improved thermosetting polyurethane polymer composition and method of use has been discovered, which composition is suitable particularly for cast molding, and more particularly in RIM processes to produce small or large molded articles. The compositions overcomes the difficulties of the prior art involving the use of aromatic diamine chain extenders particularly as regards flexual modulus, "cold break" properties and gel time. The thermosetting polymer composition of the invention comprises a polyisocyanate, such as a di-isocyanate, and more particularly, a prepolymer, such as an MDI-polyol, e.g. diol prepolymer, ranging from about 0.5% to 30% free isocyanate, and more particularly, 15% to 25% free isocyanate, and an aromatic diamine, for example, a di-alkyl aromatic diamine, such as the di-ethyl toluene diamine, as well as di-alkyl thio aromatic diamine, such as the dimethyl thiotoluene diamine and other aromatic amine chain extenders.

Optionally, the thermosetting urethane composition may include and desirably a polyol compound, either a polyether or a polyester, to provide for a hybrid polyurea polyurethane in a RIM molding compositions and optionally, a catalytic amount of a catalyst typically an organic metal catalyst, such as a tin or lead fatty acid catalyst or a mixture thereof, as well as other curing agents, accelerators and catalysts and the usual fillers, such as particulate-type material, glass fibers commonly used in RIM or cast molding or other urethane processes.

The thermosetting urethane composition includes an effective "cold breaking" additive amount of a triethanol amine or a triethanol amine derivative, such as a polyalkylene oxide triethanol amine reaction product so as to provide a resulting thermoset polymer employable in a RIM molding process and having a flexual modulus of over about 80,000-90,000 psi at 75° F. and with the thermoset polymer substantially free of "cold break" properties after the reaction and demolding of the molded article and with the thermoset polymer having a practical molding gel time, typically of less than 20-40 seconds for larger RIM parts and more than about 2-5 seconds for smaller RIM parts.

The invention also includes a process of preparing a thermoset urethane polymer, for example, an urethane hybrid urea polymer, particularly in a RIM molding process and which process comprises injecting into an open or closed mold, such as a closed RIM mold, a reaction mixture comprising a polyisocyanate, such as an MDI prepolymer, with excess isocyanate, an aromatic diamine, and more particularly a di-alkyl aromatic diamine or di-alkyl thio aromatic diamine for reaction with the isocyanate, with the isocyanate prepolymer being based on a isocyanate polyol prepolymer, and optionally, including a small but effective or catalytic amount of an organo-metallic catalyst, and optionally, an amine catalyst, and which reactive composition contains an effective "cold break"-reducing amount of an additive compound selected from the group consisting of a triethanol amine, a triethanol amine polyalkylene reaction compound, such as a triethanol amine ethylene or propylene oxide capped reaction product and mixtures thereof, reacting the said reactive mixture to form a molded product in the mold in a defined gel time, typically from 2 to 20 seconds, and thereafter removing the molded product from the mold.

The molded product is characterized by having a flexual modulus of over about 80,000-90,000 psi at 75° F., and the molded polymer substantially free of "cold break" properties after demolding. In addition, the process includes carrying out the process in the presence of a thioamine aromatic compound, such as a di-alkyl thioaromatic diamine, wherein the additive product reduces the gel time of the di-alkyl thioaromatic diamine to less than about 20 seconds and reduces the gel time of the mixed alkyl diaromatic diamine and the alkyl thioaromatic diamine to less than about 10 seconds, and in addition, helps remove any sulfur or thio type odor associated with the molded product. Further, the process includes the employment of the "cold break" additive compound in an amount sufficient to adjust the gel control time, so that when an di-alkyl aromatic diamine is employed as the reactive compound, the gel time is increased to a practical type gel time, typically of over two seconds and more with large, molded objects in order to carry out an effective RIM process or the gel time reduced where a thio chain extender is used.

A molded thermoset urethane polymer produced by the cast molding, and in particular, the RIM molding process, or by any other process, such as casting, spraying, or lay-up, with or without fillers or glass fibers or other reinforcing type material, provides for a unique product which has high flexual modulus strength ranging typically up to about 300,000 psi as 75° F., and more typically, up to 200,000 psi without exhibiting "cold break" and providing for rapid and effective gel times and removing any thio odor where a thioamine chain extender is employed.

Thus, the molded products are unique in not exhibiting "cold break" properties. "Cold break" is a practical test relative to the green strength of a molded object wherein the corner of the molded object is pressed against a sharp edge immediately after demolding and if the edge breaks, then the object does not have good green strength, that is, it has "cold break" properties on demolding. This practical corner or "cold break" test for molding objects provides a rapid, practical test of the molded object against flexual modulus. It is of course desirable to provide for a molded object after molding, particularly in a RIM process to have no "cold break" properties, that is, not to corner break, and yet have a high flexual modulus.

The "cold break" additive compound is useful in the practice of the invention to reduce "cold break" and may be employed in various amounts to provide for the increase in flexual modulus above 80,000 psi to avoid "cold break" and also to control the gel time, depending on the particular aromatic diamine employed or the mixtures thereof. Typically, the amount of the "cold break" additive may range for example from as low as 1 to 40 parts/100 parts of the total urethane reactive composition and more particularly for example from about 5 to 30 parts. Generally, the "cold break" additive is employed on the B side of the urethane formulation in combination with the aromatic diamine and the catalyst or accelerator systems employed. In one commercial embodiment, the "cold break" additive compounds are admixed with and employed and sold as compositions together with the appropriate aromatic aramine chain extending compounds alone or in admixture, such as for example, in combination with DETDA or the di-alkyl thio aromatic diamines, such as ETHACURE-300 or mixtures thereof. Where desired, the additive compound may also be sold in combination with the polyol so as to provide for a hybrid polyurea polyurethane composition and the reaction with the MDI prepolymer on the A side.

In one embodiment, the "cold break" additive comprises a triethanol amine, more particularly, in substantially pure 99% triethylene form. Triethanol amine is available commercially in 99% form and in mixtures of about 25% of weight of diethanol amine and up to about 5% of monoethanol amine, with the remainder triethanol amine. The preferred "cold break" additive comprises the highest purity form of triethanol amine. Surprisingly, it has been found that the use of diethanol amine is not wholly effective in that the use of diethanol amine provides for a gel time which is far too fast in connection with DETDA, that is, less than one second, while correspondingly, the tripropanol amines do not eliminate "cold break". Therefore, triethanol amine in 99% form is preferred over the commercial (85%) form which is not as effective indicating that the effective and critical ingredient is a triethanol amine alone.

While the employment of triethanol amine as a "cold break" additive is surprisingly effective, it has been discovered that at flexual modulus near 200,000 psi, the impact strength of the molded object begins to be effected. In order to maintain good impact strength of for example 3-5 notched izods or more, a modification was made in the molecular weight of the triethanol amine "cold break" additive by reacting the triethanol amine with an alkylene oxide, such as for example, a C2, C3 alkylene oxide, and more particularly, an ethylene oxide or propylene oxide to provide for a triethanol amine end capped ethylene oxide or propylene oxide product of increased molecular weight, such as for example, ranging from 600 to 1,000 or more. The triethanol amine polyalkylene "cold break" additive product typically comprises a triethanol amine and a ethylene oxide capping ranging from 10% to 25%, the triethanol amine product providing for a high flexual modulus together with higher impact strengths at the higher flexual modulus and without "cold break". The employment of the triethanol amine polyalkylene amine additive compound is particularly useful for example in RIM processes wherein it is desirable to produce large parts, such as automotive parts, where increased gel times are necessary up to 30–60 seconds at high impact strengths.

Where it is desirable to maintain high impacts, for example, 5 notched izods, or greater in a molded product, it is desirable to employ the triethanol amine or the triethanol amine polyalkylene amine "cold break" additive in combination with plasticizing amounts of polyester-type plasticizers, e.g. 5 to 35 parts of the composition, and more particularly with saturated fatty acid di or triesters, and more particularly with polyalkylenes, for example, $C_2$ to $C_3$ or $C_6$ to $C_8$ fatty acid esters, such as diols, such as a polyethylene adipate diol. Thus, the use of triethanol amines or modified triethanol amines and polyesters or polyester diols with aromatic diamines and MDI prepolymers and the hybrid polyurea polyurethane type molded products produces high impact, high flexual strength, high flexual modulus and products without "cold break".

It is a further discovery that "cold break" additives are particularly useful in combination with the thio aromatic diamines, such as the dimethyl aromatic diamines, like ETHACURE-300. The employment of dialkyl thio aromatic diamines slows down the reaction and provides for a longer gel times of 2 to 3 minutes, and even if mixed with a DETDA, the reaction time is still not fast, that is, not less than 10 seconds. However, where the thio aromatic diamines are employed, a strong odor is produced which often stays in the molded parts. It has been found that when using the triethanol amine or the triethanol amine polyalkylene additive with the system employing the thio aromatic diamines, the odor seems to dissipate rapidly in the molded parts making the molded part far more acceptable. With those combinations of the triethanol amine and triethanol amine polyalkylene additive with the dimethyl thiotoluene diamine it is desirable to provide for a liquid reactive type mixture for addition to a urethane composition which increase the gel time and avoids the strong odor associated with the use of the thio additive.

The use of aromatic diamines in RIM technology has been a major development and provided for cycle times to be reduced, green strength improved and high temperature resistance imparted to the molded part. The major market for aromatic diamine and isocyanate technology in the RIM process was automotive facia in vertical body parts, while the requirements for stiffer materials were either sheet molding compounds or metal. As discussed, the attempts above 80,000 psi flexual modulus without fillers using aromatic diamine isocyanate technology has resulted in the past in poor impact properties, very high molding temperatures and a phenomenon known as "cold break". "Cold break" can be described by the reaction of the polyol side containing the aromatic diamine with the isocyanate in the RIM process producing a molded product which immediately coming from the mold breaks like brittle glass being dropped or when the corner is bent over an edge.

The employment of DETDA polyol and different types of isocyanates to produce a hybrid polyurea polyurethane RIM product as described in U.S. Pat. No. 4,218,543 has provided for a RIM process with a respectable high speed molding technique, like injection molding; however, the limitations of this technology have been to control the gel times and not exceeding 80,000 psi flexual modulus without "cold break" in the molded part. The employment of a methyl thiotoluene diamine, such as ETHACURE-300, in a RIM technology does lengthen the gel time for larger part production; however, this aromatic diamine does not eliminate "cold break" above 80,000 psi flexual modulus even when employed with blends of a thio aromatic diamine with moca (see U.S. Pat. No. 4,631,298) to reduce "cold break". It also has been discovered that the triethanol amine unexpectedly and surprisingly when mixed with aromatic diamines and isocyanates, eliminates "cold break" up to about 300,000 psi flexual modulus. "Cold break" is either reduced or eliminated depending upon the particular polyol and MDI employed in the process.

A wide variety of polyisocyanates may be employed in the practice of the invention, including aliphatic (e.g. moca) and aromatic di-isocyanates (e.g. TDI and MDI), either alone as polyol prepolymers containing an excess of isocyanate. However, the invention is particularly applicable to those MDI polyol prepolymers employed in RIM technology and the A side comprises the MDI polyol prepolymer and the B side comprises the aromatic diamine, a polyol, a catalyst and importantly, an effective amount of the triethanol amine "cold break" additive. The polyol employed both to prepare the prepolymers and on the B side of the formulation may vary and typically comprises those polyols, like diols and triols and polyol products of from about 400 to 10,000 MW and actually employed in the RIM process to include but not be limited to the trialkylene glycols, such as triethyl or tripropylene glycol, reactive for example with an MDI prepolymer. The polyols added to the B side may comprise polyols like polyether or high molecular weight di or triamine polyols, e.g. 2000–5000 MW, such as JEFFAMINES (trademark of Texaco Co.) The polyisocyanates, polyols, catalysts, accelerators and other fillers and reinforcing additives and the like, stabilizers and other additives or those employed in the composition may be those typically employed in urethane compositions and particularly RIM molding compositions.

For the purposes of illustration only, the invention will be described in connection with certain preferred embodiments. However, it is recognized that various modifications, changes, additions and improvements may be made in the preferred embodiments without departing from the spirit and scope of the invention.

DESCRIPTION OF THE EMBODIMENTS

EXAMPLE 1

A RIM urethane composition was prepared as follows:

| Parts by weight (pbw) | Product |
| --- | --- |
| *B Side* | |
| 25 - DETDA | ETHACURE-100 (Ethyl Corporation) |
| 25 - Polyol | 5000 MW compound polyol 1134 (Union Carbide Corporation) |
| 0.1 - Catalyst | Dibutyl tin dilaurate |
| 0.3 - Catalyst | Triethylene diamine (DABCO, from Air Products Company) |
| *A Side* | |
| 52 - MDI polyol prepolymer | 21.5% excess NCO (Rubicon LF209, Rubicon Chemical |

| Parts by weight (pbw) | Product |
|---|---|
| | Company) |

The two components of Example 1, the A and B side, were pumped through a high pressure RIM machine at an injection pressure of 2,000 psi at a temperature of 90° F. to a test mold of 12 inches by 12 inches by one and one-eighth inches with the mold temperature being 150° F. The mold was opened after 60 seconds after injection and the demolded sample was removed and tested for "cold break" properties. A corner of the molded test sample was bent over and tested for "cold break", and the sample broke immediately on testing. The amount of the flexible polyol in the B side was then increased from 25 pbw to 50 pbw before the "cold break" in the test sample was eliminated. The resulting test sample had a flexual modulus of 80,000 psi at 75° F. The gel time of the composition was 1-2 seconds.

EXAMPLE 2

Example 1 was now repeated, however, employing two different types of MDI prepolymer on the A side. In one test, 38 pbw of an MDI prepolymer LF168 Rubicon 29% NCO was employed. The "cold break" of the test sample was worse until a much higher amount of the flexible polyol was added in the amount of 75 pbw of the polyol before the "cold break" was eliminated. An additional test sample was carried out with 42 pbw of a different MDI prepolymer of LF179 Rubicon 23% NCO, a prepolymer prepared employing a triprolylene glycol and an MDI. The test sample gave the same test results as above with 75 pbw of polyol required to eliminate "cold break" and yet the flexual modulus was only 80,000 psi.

EXAMPLE 3

A RIM urethane composition was prepared as follows:

| Parts by weight (pbw) | Product |
|---|---|
| | B Side |
| 25 - DETDA | ETHACURE 100 (Ethyl Corporation) |
| 50 - Polyol | 5000 MW compound polyol 1134 (Union Carbide Corporation) |
| 0.1 - Catalyst | Dibutyl tin dilaurate |
| 0.3 - Catalyst | Triethylene diamine (DABCO, Air Products Company) |
| 10 - "cold break" additive | Triethanol amine (99%) |
| | A Side |
| 95 - MDI polyol prepolymer | 21.5% excess NCO (Rubicon LF209, Rubicon Chemical Company) |

Example 1 was repeated employing the above RIM formulation which contained the "cold break" additive, triethanol amine. The RIM composition above was employed as in Example 1; however, the test sample from the mold did not exhibit any "cold break" and had a flexual modulus of 65,000 psi. The example was repeated reducing the polyol from 50 pbw to 0 in the B side, and appropriate stoichiometric reductions in the MDI prepolymer in the A side. Samples from the mold did not exhibit any "cold break" and further produced flexual modulus of 300,000 psi, with the gel times reduced from 8 seconds to 2.4 seconds and demolding of the test sample was reduced from 60 seconds to 30 seconds. This example was repeated employing a different MDI prepolymer as in Example 2, to wit, MDI prepolymers LF168 and LF179 with substantially the same results except as the count of excess isocyanate in the prepolymer increased, the brittleness of the test sample increased. Thus, the employment of triethanol amine produced dramatic results in eliminating "cold break" and permitting a very high flexual modulus and producing a unique hybrid polyurea polyurethane molded product.

EXAMPLE 4

The reactivity of the prior art urethane compositions of Examples 1 and 2, as well the inventive composition of Example 3, is quite fast and would be suitable only in certain RIM processes for example producing small parts. In order to produce large parts, such as automotive parts, increased gel times must be obtained. To increase the gel times, a di-alkyl thio aromatic diamine, such as ETHACURE-300, either alone or in admixture, must be substituted in whole or in part for the DETDA. Where the ETHACURE-300 is substituted entirely for the DETDA formulations of Examples 1, 2 and 3, that is, the 80:20 mixture of the 2,4 and 2,6 isomers of di-methyl thio toluene diamine, the gel time of the formulation was increased to about 30 seconds. However, the employment of the triethanol amine as a "cold break" additive was still effective in eliminating "cold break" of the test sample and providing a high flexual modulus.

Example 5

It has been found that at very high flexual modulus, near or over about 200,000 psi, the test sample impact strength may begin to be reduced. It is desirable to maintain molded product impact strengths of 3 to 5 notched izods or more in the test sample. A RIM urethane composition was prepared as follows:

| Parts by weight (pbw) | Product |
|---|---|
| | B Side |
| 25 - DMTDA | ETHACURE-300 (Ethyl Corporation) |
| 20 - "cold break" additive | TEOA-EO* |
| 0.1 - Catalyst | Dibutyl tin dilaurate |
| 0.3 - Catalyst | Triethyl diamine |
| | A Side |
| 72 - MDI polyol prepolymer | 21.5% excess NCO (Rubicon LF209, Rubicon Chemical Company) |

*a reaction product of TEOA and ethylene oxide (EO) to provide a product having a molecular weight of about 734, a hydroxyl number of about 234 and 25% EO capping.

RIM test samples were produced as before employing this formulation. The formulation had a 30 second gel time and produced test samples having a flexual modulus of 250,000 psi with no "cold break" and with impact strengths of about 5 notched impact pounds per foot. The substitution of other MDI prepolymers, such as LF168 and LF179, in the above formulation were also tried with the same results. However, the impact strengths were better with the LF20.

Example 6

A RIM urethane composition of higher impact strength was prepared as follows:

| Parts by weight (pbw) | Product |
|---|---|
| | B Side |
| 25 - DMTDA | ETHACURE-300 (Ethyl Corporation) |
| 20 - "cold break" additive | TEOA-EO* |
| 25 - Saturated polyester | Polyethylene adipate diol (OH #112) |
| 0.1 - Catalyst | Dibutyl tin dilaurate |
| 0.3 - Catalyst | Triethyl diamine |
| | A Side |
| 72 - MDI prepolymer | 21.5% excess NCO (Rubicon LF209, Rubicon Chemical Company) |

In order to obtain higher impact strengths, a saturated fatty acid polyalkylene was incorporated into the RIM urethane composition. The urethane composition was used in the RIM process to produce a RIM test sample mold as before employing the formulation with the saturated polyester. The test sample exhibited improved impact strengths to 7 notched izods per foot pounds, while the flexual modulus was reduced to 250,000 psi indicating the improvement in impact strengths employing a saturated polyester in the formulation. Further tests were carried out employing a triethanol amine 99% commercial grade substituted for the TEOA-EO in the same amount in the formulation as above with the same test results being obtained, except that the test sample exhibited a flexual modulus of 250,000 psi and impact strengths of 6 foot pounds izod notched were obtained. Gel times of the formulation were still controllable to within 30 seconds.

The ETHACURE-300 chain extender employed in the prior formulation has a sulfur substituting for two of the nitrogens, and the use of this chain extender tends to slow down the reaction rate. It was noticed however that a very strong smell was produced in the test sample which stays in the molded parts. However, when employing the triethanol amine or the TEOA-EO as a "cold break" additive, this thio type odor seemed to dissipate rapidly making the test mold parts acceptable for odor. Further tests were carried out employing blends of DETDA and DMTDA and TEOA and TEOA-EO and also with the saturated polyester and approximately the same test results being obtained except that where DETDA was employed as the chain extender, the speed of reaction will increase, that is, the gel time will decrease, depending upon the amount of DETDA employed.

As established by the foregoing test results, the use of triethanol amine or a modified triethanol amine end capped with ethylene oxide employed in compositions employing aromatic diamines and MDI prepolymers reduces or eliminates the "cold break" properties of RIM test samples and produces high flexual modulus RIM molded products. In addition, the use of the triethanol amine or modified TEOA-EO with a thio type chain extender reduces the odor in the test molded parts. Further, the employment of the triethanol amine or modified TEOA-EO together with saturated polyesters, such as saturated polyester plasticizers, in the compositions, such as polyester diols, in combination with aromatic diamines and MDI prepolymers, produced a high impact strength test samples of 5 izod notched pounds per foot or more, high flexual modulus, that is, more than 100,000 flexual modulus psi, RIM products without "cold break".

What is claimed is:

1. In a polymer molding composition, which composition comprises a polyisocyanate and an aromatic diamine chain extender for reaction with the polyisocyanate and optionally a catalytic amount of a catalyst to effect a reaction between the polyisocyanate and the aromatic diamine to provide a thermoset polymeric reaction product having "cold break" properties on demolding, the improvement which comprises a "cold break"-reducing amount of an additive compound, the additive compound selected from the group consisting of triethanol amine and a triethanol amine-polyalkylene oxide reaction product to provide a thermoset polymer having a flexual modulus of over about 80,000 psi at 75° F. and the thermoset polymer substantially free of "cold break" properties after reaction.

2. The polymer composition of claim 1 wherein the polyisocyanate comprises an MDI polyol prepolymer with the excess isocyanate groups ranging from about 5% to 30% excess isocyanate.

3. The polymer composition of claim 2 wherein the MDI polyol prepolymer comprises an MDI-polypropylene glycol prepolymer having from about 15% to 30% excess isocyanate.

4. The polymer composition of claim 1 which includes a reactive amount of a polyol or amine polyol.

5. The polymer composition of claim 1 wherein the composition comprises a separate A side of an MDI polyisocyanate polyol prepolymer with excess isocyanate and a separate B side comprising the aromatic diamine, an organo-metallic catalyst and the "cold break"-reducing additive and the B side substantially free of a polyol.

6. The polymer composition of claim 1 which includes an organo-metallic catalyst which comprises a di-alkyl tin fatty acid catalyst.

7. The polymer composition of claim 1 which includes as the "cold break"-reducing additive a triethanol amine ethylene oxide end capped reaction product having a molecular weight of from about 600 to 1,200.

8. The polymer composition of claim 1 wherein the aromatic diamine comprises a di-ethyl toluene diamine.

9. The polymer composition of claim 1 wherein the aromatic diamine comprises a dimethyl thiotoluene diamine.

10. The polymer composition of claim 1 wherein the composition includes an impact-strength-increasing amount of a fatty acid saturated polyester.

11. The polymer composition of claim 10 wherein the saturated polyester comprises a polyethylene adipate diol.

12. The polymer composition of claim 11 wherein the thermoset polymer has an impact strength of greater than about 5 izod notched foot-pounds and a flexual modulus of greater than about 150,000 psi.

13. The polymer composition of claim 1 wherein the "cold break"-reducing additive compound is present in an amount ranging from about 5 to 40 parts per 100 parts of the composition.

14. In a hybrid polyurea-polyurethane composition suitable for use in a RIM molding process and which composition consists essentially of an MDI polyol prepolymer with excess isocyanate groups, a di-ethyl toluene diamine chain extender for reaction with the MDI isocyanate prepolymer, and a catalytic amount of a catalyst, the improvement which comprises a "cold break"-reducing amount of from about 5 to 40 parts of the composition of an additive compound selected from the group consisting of triethanol amine and a triethanol amine-ethylene oxide end capped reaction product to provide a thermoset polymer product and a flexual modulus over about 80,000 psi at 75° F. and substantially free of "cold break" properties after demolding of the thermoset polymer from the mold.

15. The polymer composition of claim 14 which includes an impact-strength-enhancing amount of a saturated polyester fatty acid.

16. The polymer composition of claim 14 which includes a dimethyl thiotoluene diamine to increase the gel time of the composition.

17. In a hybrid polyurea-polyurethane polymer composition for use in a RIM cast molding process which composition consists essentially of an MDI polyol prepolymer with excess isocyanate groups and a chain extending amount of a dimethyl thiotoluene diamine for reaction with the MDI isocyanate prepolymer and a catalytic amount of a catalyst to effect the reaction, the improvement which comprises a "cold break"-reducing amount of from about 5 to 40 parts of the composition of an additive compound selected from the group consisting of triethanol amine and a triethanol amine-ethylene oxide end capped reaction product to provide a thermoset polymer having a flexual modulus over about 80,000 psi at 75° F., substantially free of "cold break" properties and substantially free of any thio odor.

18. The process of preparing a molded thermoset polymer which process comprises:
   a) injecting into a closed mold under high pressure the polymer composition as set forth in claim 1;
   b) reacting said polymer composition in the closed mold to form a molded thermoset polymeric reaction product; and
   c) removing the thermoset molded polymeric reaction product from the mold, the product characterized by a flexual modulus of greater than 80,000 psi at 75° F. and exhibiting substantially no "cold break" properties.

19. A thermoset molded polymeric reaction product produced by the process of claim 18.

20. A chain-extending composition suitable for use in polymer compositions employed in RIM cast molding processes and which composition comprises:
   a) a di-alkyl aromatic diamine as a chain extender for the polyurethane composition; and
   b) a "cold break"-reducing amount of an additive compound selected from the group consisting of triethanol amine and a triethanol amine-alkylene oxide reaction product.

21. The chain-extending composition of claim 20 wherein the aromatic diamine comprises a di-ethyl toluene diamine.

22. The chain-extending composition of claim 20 wherein the aromatic diamine comprises a dimethyl thiotoluene diamine.

23. The chain-extending composition of claim 20 wherein the additive compound comprises a triethanol amine-ethylene oxide end capped reaction product having a molecular weight of from about 600 to 1,200.

24. The polymer composition of claim 1 wherein the gel time of the reaction is over two seconds and the aromatic diamine comprises a diethyl toluene diamine.

25. The polymer composition of claim 1 wherein the gel time of the reaction is less than about twenty seconds and the aromatic diamine comprises dimethyl thiotoluene diamine.

26. The polymer composition of claim 14 which includes a polyol or an amine polyol and which composition has a gel time of from about two to twenty seconds.

* * * * *